United States Patent [19]
Olson

[11] 3,759,540
[45] Sept. 18, 1973

[54] VEHICLE CHASSIS
[75] Inventor: Hjalmar A. Olson, North East, Pa.
[73] Assignee: General Electric Company, Erie, Pa.
[22] Filed: Dec. 13, 1971
[21] Appl. No.: 207,403

[52] U.S. Cl. ............. 280/106 R, 296/28 F, 180/58
[51] Int. Cl........................................... B62d 21/00
[58] Field of Search .................. 280/106; 296/28 F; 188/1 C; 213/1 A; 105/5, 6; 293/52 F; 180/58, 64

[56] References Cited
UNITED STATES PATENTS
2,100,561  11/1937  Kliesrath........................ 180/64 R
2,719,044  9/1955  Walter............................ 180/58 X
3,171,669  3/1965  Barenti........................... 280/106 R
2,846,263  8/1958  LaRue............................ 296/28 F
2,108,215  2/1938  Stief.............................. 296/28 F

Primary Examiner—Philip Goodman
Attorney—Edward W. Goebel

[57] ABSTRACT

A lightweight vehicle chassis withstands torsional loads and becomes structurally rigid through the use of a plurality of closed supporting compartments which extend over a substantial portion of the chassis. The closed supporting compartments are formed out of a top layer and a bottom layer of sheet material which are interconnected by vertical webs of the same sheet material. The closed compartments at the front end of the chassis form a dog-leg configuration including plastic hinge areas of predictable failure which absorb energy upon impact of the front end of the motor vehicle with a solid object.

8 Claims, 4 Drawing Figures

VEHICLE CHASSIS

BACKGROUND OF THE INVENTION

This invention relates to chassis for motor vehicles, and more particularly, to chassis for supporting lightweight motor vehicle bodies.

Developments in recent years in the materials field have made it possible to use relatively lightweight materials for the manufacture of motor vehicle bodies. These lightweight materials include impact resistant plastics such as Lexan manufactured by the General Electric Company. These materials are not only lighter and more impact resistant than the sheet metal materials used for vehicle bodies in the past, but they are also resistant to rust and corrosion as well.

One drawback in the use of these plastic materials for the bodies of vehicles is that they cannot provide either a stabilizing or a torsion resisting function for the vehicles. For example, when one corner of a vehicle is loaded to a greater extent than the other corners, the chassis of the vehicle is said to be under a torsional stress. That is, the load tends to bend the loaded corner of the vehicle and twist some of the supporting members of the vehicle. Vehicle chassis are also subjected to torsional loads when one of the wheels of the vehicle hits a bump. One corner of the vehicle is jarred, tending to twist the chassis. Obviously, the chassis of the vehicle must withstand these torsional loads or it will be bent. In vehicles that have metal bodies, the bodies themselves and their heavy metal supports aid the chassis in resisting torsion and in maintaining a rigid structure. The metal bodies can be subjected to torsional stresses without cracking or tearing.

Plastic vehicle bodies of the type discussed above cannot provide a stablizing function in aid of the chassis because the plastic materials used cannot withstand compressional and shear forces. The plastic materials used for these bodies not only cannot aid in resisting torsional stresses, but also actually have a tendency to crack and be torn when subjected to torsional loads. Thus, normal vehicle chassis cannot be used to support the newly developed plastic vehicle bodies.

Heretofore, heavy duty chassis were used to support plastic vehicle bodies. Heavy steel plate and beams were used to reinforce the normal chassis and, thus, guard against the torsional stresses which might crack and tear the plastic bodies themselves. These heavy duty chassis increased the weight of the vehicles. By so doing, the size of the engines or motors needed to propel the vehicles was increased as well. And, the payload of the vehicles, the actual load which each of the vehicles could carry besides the weight of the vehicle itself, was reduced. And, even the heavy-duty chassis have been known to twist sufficiently from time to time to cause the plastic vehicle bodies to crank.

Recently there has been an increased emphasis on the development of vehicles having relatively limited amounts of energy available from propulsion sources, as compared with vehicles using internal combustion engines. One example of this type of vehicle is the electric motor-driven vehicle which has its energy limited by the batteries or other such power sources which energize a propulsion motor or motors of the vehicle. For vehicles of this type, it is imperative that the weight of the chassis and bodies be as small as possible so as to maximize the payload which the vehicle can carry with its limited power supply. Thus, the chassis should have the maximum strength per unit of weight which can practicably be obtained.

Thus, it is one object of this invention to provide lightweight vehicle chassis which are suitable for supporting plastic vehicle bodies.

It is another object of this invention to provide lightweight vehicle chassis which can withstand torsional loads with minimal distortion.

It is a further object of this invention to provide vehicle chassis manufactured out of relatively thin, sheet material which have a high degree of structural rigidity.

It is still a further object of this invention to provide lightweight vehicle chassis which withstand torsional loads with minimal distortion and without receiving additional support from the bodies of the vehicles.

It is still another object of this invention to provide a vehicle chassis having a high strength per unit of weight ratio as compared with conventional vehicle chassis.

BRIEF DESCRIPTION OF THE INVENTION

Briefly stated, and in accordance with one aspect of this invention, a lightweight chassis is provided to support a motor vehicle and to withstand the various torsional loads to which it is subjected, with a minimal amount of distortion. The chassis itself is manufactured out of relatively thin sheet metal material. A plurality of vertical webs are manufactured out of this sheet metal material, including a first pair of webs which extend the length to which the chassis is manufactured in accordance with this invention. The plurality of vertical webs includes at least a second pair of webs which extend across the width of the chassis at the place where they are mounted. A top layer of sheet metal material is fastened to the vertical webs over substantially the whole length and width of the load carrying area of the chassis. A bottom layer of sheet metal material is also fastened to the vertical webs over substantially the length and width of the chassis. Thus, these layers of sheet metal material and the vertical webs form a plurality of closed supporting compartments under the load carrying area of the chassis. These closed compartments provide the structural rigidity for the chassis which allows the chassis to withstand torsional loads with minimal distortion.

By webs of sheet material, I mean closed sections of such material which can be fastened to the top and bottom layers of sheet metal material, as well as to adjacent webs. The webs themselves may be solid. The webs may also have one or more portions cut out of the center sections thereof of such a size that the required supporting strength is not seriously impaired. A web of the latter type is said to "frame" one side of a closed supporting compartment allowing the compartment to still be "closed" within the meaning of the word as used in the application. The webs may be three or four sided or may have a larger number of sides as desired. In accordance with the broader aspects of this invention, it is possible for the webs to have an infinite number of sides so that the closed supporting compartments have a round cross section.

The specification concludes the claims particularly pointint out and distinctly claiming the subject matter of this invention. The organization and manner in process of making and using this invention, together with further objecte and advantages thereof, may be best understood by reference to the following description

DESCRIPTION OF PREFERRED EMBODIMENTS

Figure 1:
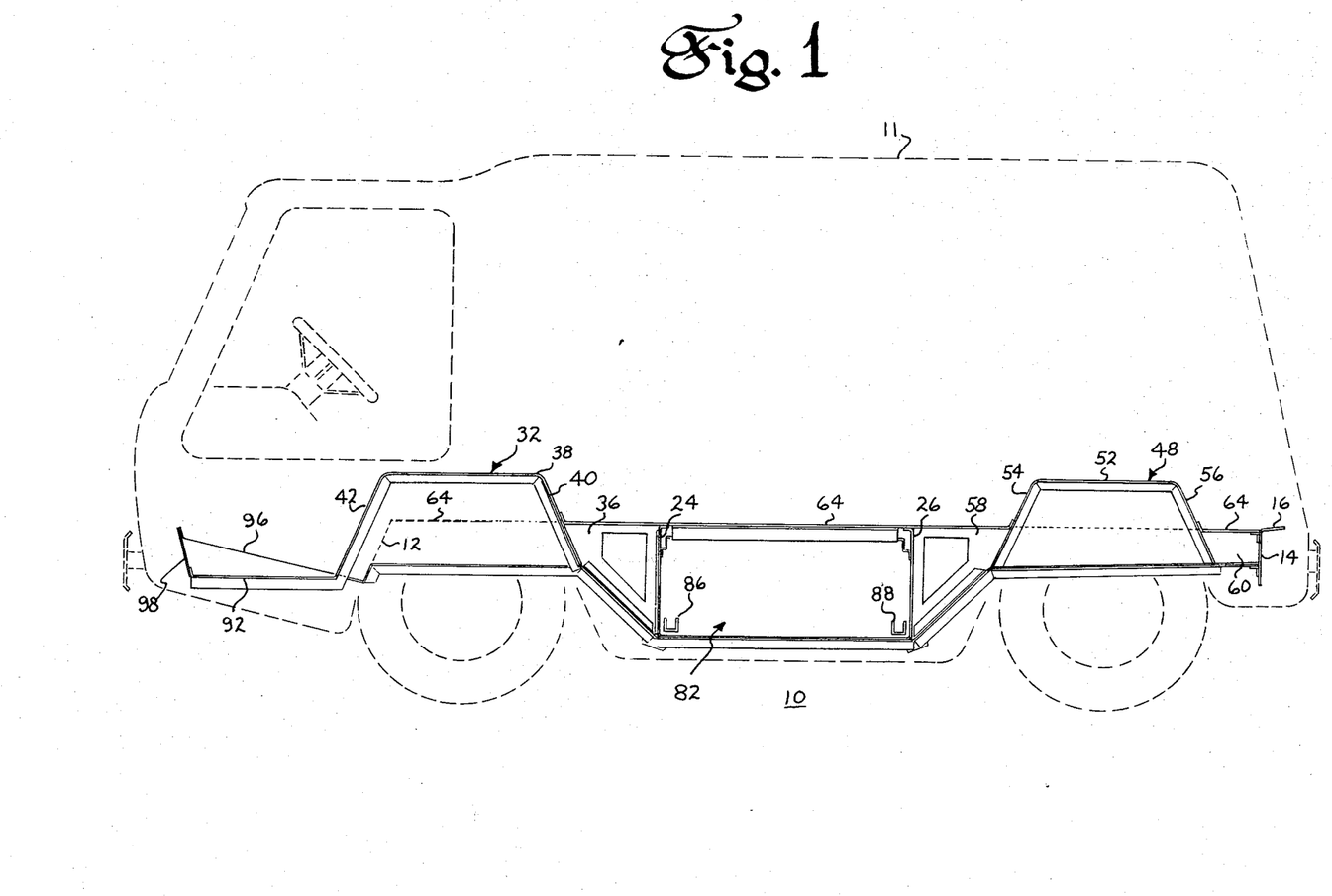
FIG. 1 is a side view of a lightweight chassis for a motor vehicle embodying the principles of this invention, with the wheels and the body of the vehicle shown in phantom.
Figure 2:
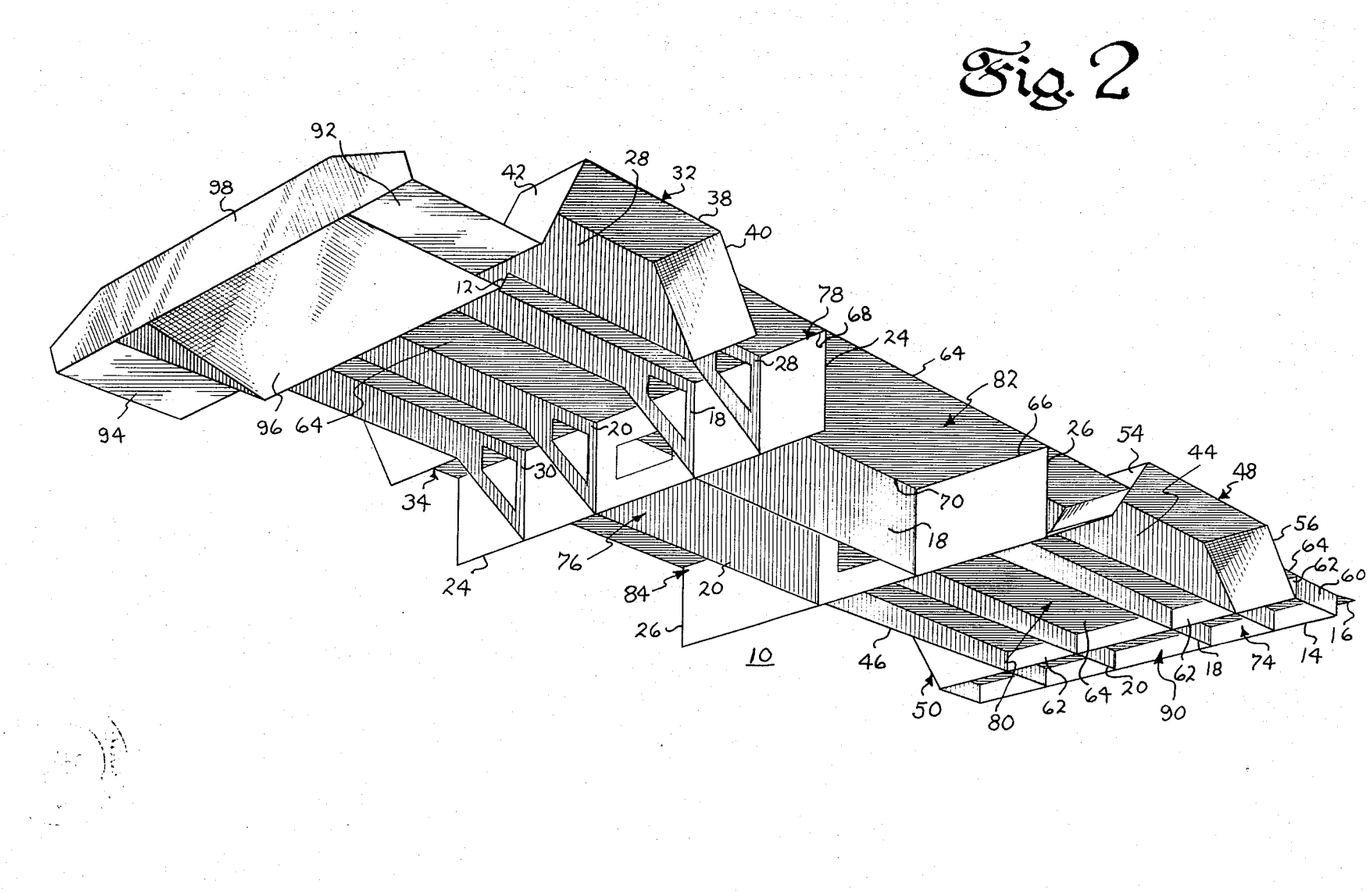
FIG. 2 is a schematic perspective view of the lightweight chassis shown in FIG. 1 viewed from a point at the bottom, left front thereof.
Figure 3:
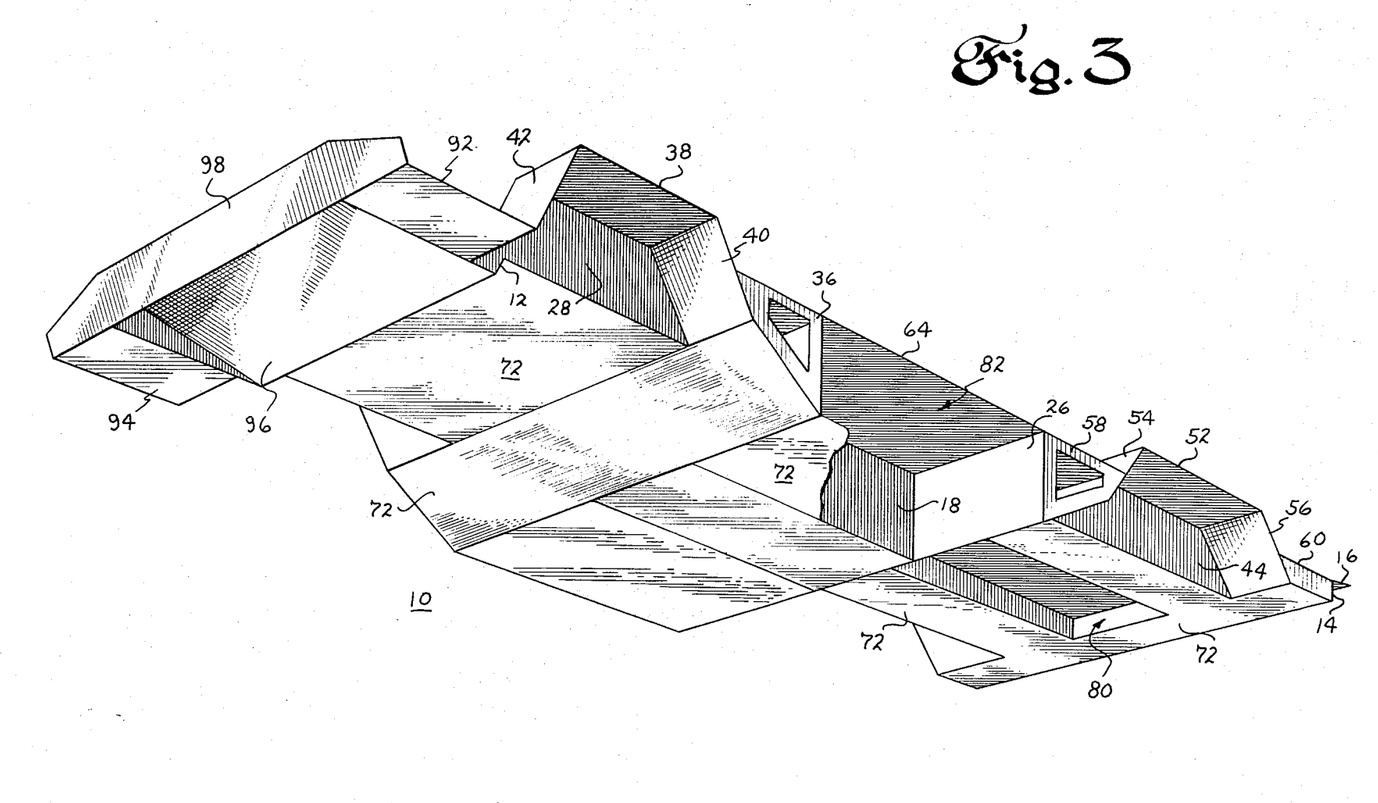
FIG. 3 is a perspective view of the vehicle chassis which is similar to FIG. 2 except that a bottom sheet and certain vertical webs have been added.

FIGS. 1 thru 3 are used to describe the first embodiment of this invention, a portion of a chassis 10 of a motor vehicle. To orient the reader, a body 11 of the vehicle is added in phantom about the chassis which is shown at the bottom of the vehicle. While chassis manufactured in accordance with the principles of this invention can be used for many types of motor vehicle structures, they are particularly useful for those vehicles having bodies which cannot be subjected to torsional stresses, as described above. Chassis made in accordance with this invention need not rely upon the body of the motor vehicle to provide the required torsional rigidity.

Referring now to FIGS. 2 and 3 along with FIG. 1, the portion of the chassis shown which is manufactured in accordance with the principles of this invention is that portion which extends from a web of sheet material 12 which lies in substantially a vertical direction, to a vertical web of sheet material 14 at the rear end of the vehicle chassis. The web of material 12 is often referred to as a heel sheet, while the web of material 14, along with the horizontal portion 16, is referred to as a bumper bracket.

The portion of the chassis extending between the heel sheet 12 and the bumper bracket 14 comprises a plurality of closed supporting compartments which extend under the load carrying area of the chassis so as to provide structural rigidity. These closed supporting compartments are made up of a plurality of vertically extending webs manufactured out of sheet material. These webs are covered by a top layer and a bottom layer of sheet material which complete the closed supporting compartments.

Thus, as seen in FIGS. 2 and 3, a first pair of vertical webs 18 and 20 extends the full length of that portion of the chassis which uses the principles of this invention, that is from the heel sheet 12 at the front of the chassis to the bumper bracket 14 at the rear of the chassis. As is true of the other structural members of the chassis 10, the longitudinally extending webs 18 and 20 are manufactured out of sheet material. By way of example, webs of this type have been manufactured out of sheets of Type 304 stainless steel which are thirty thousandths of an inch thick. The webs 18 and 20 are contoured in a ramp-like fashion with a height which decreases toward the front and the rear ends of the chassis. The reason for the decreasing height of the webs 18 and 20, and adjacent webs which will be described below, is that the load of the vehicle is concentrated at the mid-section of these webs, and the webs have been formed to provide approximately uniform strength throughout the length of the vehicle.

The chassis 10 also includes a second pair of vertical webs 24 and 26, extending across the width of the chassis, to aid in forming the closed supporting compartments referred to above. Note that the webs 24 and 26 are continuous supporting members across the width of the chassis 10, just as the longitudinal webs 18 and 20 are continuous members along the length of the chassis. The continuity of these webs aids the chassis in maintaining its torsional rigidity. This of course, does not mean that any of these webs is manufactured out of a single sheet of material. Rather, any or all of these webs can be manufactured out of a plurality of sheets of material which are welded or riveted together, or otherwise fastened together. FIGS. 2 and 3 show the various webs of material schematically to illustrate the principles of this invention. FIG. 1 shows the ends of some of the sheet material bent over for fastening purposes.

Additional vertical webs 28 and 30 are shown to extend longitudinally at the front end of the chassis, adjacent the left front wheel well 32 and the right front wheel well 34, respectively. These webs are contoured in the same manner as are the webs 18 and 20 to provide uniform strength throughout their length and to minimize the amount of material used. Each of these webs 28 and 30 extends upwardly to form the inner side of the wheel wells 32 and 34. As shown in FIG. 3, an additional shorter vertical web 36 is added between the wheel well 32 and the laterally extending web 24. A similar vertical web (not shown) is added at the opposite side of the chassis between the lateral web 24 and the right front wheel well 34.

The left front wheel well 32 comprises a top section 38, a rear section 40 which abuts the web 36 as seen in FIGS. 1 and 3, and a front section 42.

At the rear of the chassis 10 longitudinal support is provided not only by the webs 18 and 20, but also by the additional longitudinal webs 44 and 46. The webs 44 and 46 which extend between the lateral web 26 and the web which forms the pumper bracket 14, are adjacent the left rear wheel well 48 and the right rear wheel well 50, respectively. It can be seen in FIG. 2 that the webs 44 and 46 are tapered to provide uniform strength along their length which minimizes the amount of material used. It can also be observed by referring to the web 44, that these webs 44 and 46 are used as the interior sides of the wheel wells 48 and 50. The left rear wheel well 48 also includes a top, horizontal section 52, a front section 54, and a rear section 56.

FIG. 3 shows that an additional vertical web 58 is mounted between the laterally extending web 26 and the lower portion of the front section 54 of the left rear wheel well 48. Similarly, a vertical web 60 is mounted between the bumper bracket 14 and the lower portion of the rear section 56 of the left rear wheel well 48. Vertical members corresponding to the webs 58 and 60 are included in corresponding positions at the opposite side of the chassis, that is at the rear of the right side of the chassis. The rear portion of the chassis 10 also includes an additional laterally extending vertical web 62 which is mounted across the width of the chassis to further strengthen the chassis.

The chassis 10 is covered with a top layer 64 of sheet material. This top layer of sheet material extends from the heel sheet 12, which forms a web near the front of the vehicle, to the bumper bracket 14 forming a web at the rear of the vehicle. The top layer 64 may comprise a single sheet of matetral, such as sheet metal. It may also comprise a combination of smaller sheets of this material which are fastened together, as by welding or by riveting. For manufacturing purposes, for example, it may be advantageous to make certain portions of the top layer 64 and certain portions of some of the vertical webs out of one piece of sheet material. Thus, the vertical webs 24 and 26 and the portion of the top layer 64 extending therebetween can be manufactured out of one sheet of material with bends in this material occurring at corners 66 and 68.

Similarly, the portion of the longitudinal webs 18 and 20 extending between the lateral webs 24 and 26 and the portion of the top layer 64 extending between the longitudinal webs 18 and 20 (this portion of the top layer not being shown in the drawings) may also be manufactured out of one piece of sheet material with a bend occurring, for example, at a corner 70.

The manner in which the top layer and the individual webs is manufactured is not critical to this invention. If any of these is made in sections, it is important that the sections be fastened together, as by being welded or riveted by some other method of fastening. With regard to the vertical webs such as the webs 18 and 20, the sections of the webs should be aligned. Thus, the portion of the web 18 extending between the heel sheet 12 and the lateral web 24 should be aligned with the portion of this web extending between the lateral web 24 and the lateral web 26. That section of the web 18 which extends between the vertical web 26 and the bumper bracket 14 should be aligned with the other sections.

Referring now more specifically to FIG. 3, in accordance with this invention a bottom layer of sheet material 72 is fastened to the various vertical webs so that this bottom layer 72 extends over substantially the length and width of the chassis. The purpose of this bottom layer 72 is to form a plurality of closed supporting compartments under the load carrying area of the chassis 10. These closed compartments are formed by a combination of the bottom layer 72, the top layer 64, and various vertically extending webs. This invention is best carried out by providing the closed supporting compartments under as great a portion of the load carrying area of the chassis as possible. Compartments which are not fully closed should preferably have only one side missing at least where five or six sided compartments are used as shown in the drawings. The existing sides of the compartments which are not fully closed should be braced with closed compartments so that the top layer 64 and the bottom layer 72 do not tend to wrinkle when subjected to torsional loads. These closed compartments provide a structural rigidity for the chassis which allows the chassis to withstand torsional loads with a minimal distortion.

Referring to FIG. 2, a closed compartment 74 is formed at the rear of the chassis when the bottom layer 72 (seen in FIG. 3) covers the laterally extending webs 14 and 62 and the longitudinally extending webs 44 and 18. A closed compartment 76 in the middle portion of the chassis is formed when the bottom layer 72 covers the longitudinal webs 18 and 20 and the lateral webs 24 and 26.

A closed compartment 78 is also formed when the bottom layer 72 (in FIG. 3) engages the longitudinal web 28, the lateral web 24, the rear section 40 of the fender well 32 and the vertical web 36, the latter of which is shown in FIG. 3. It should be noted that the vertical web 36 has a portion cut out of its center section so that apparatus relating to the operation of the vehicle can be mounted within the compartments formed by the sheet material. A web having a center section cut out of it is said to "frame" one side of the closed supporting compartment formed by the web. However, for the purposes of this invention, a compartment formed by a web of this type is still considered to be "closed." Care should be taken that the portions cut out of the sheet material are not so large as to substantially impair the strength of the material with respect to its supporting function.

FIG. 3 shows some of the compartments formed in the chassis which are not closed within the meaning of the term as defined above. The compartment 80 is only partially closed in that the bottom layer 72 is missing. The reason for this is that the chassis shown in the attached FIGS. is intended for use as a part of an electric motor driven vehicle. The electric motor, which drives the rear wheels of the vehicle is mounted within the compartment 80 and thus the bottom layer 72 was eliminated.

Compartment 82 on the left center section of the chassis 10 is also partially closed. This compartment includes the bottom layer 72, which is partially broken away in FIG. 3 for illustrative purposes only, but it does not include a side web which, if it were included, would interconnect the webs 36 and 58. This partially closed compartment 82, and a corresponding partially closed compartment 84 on the right side of the vehicle (see FIG. 2) are used for storing batteries for the electric motor which drives the vehicle for which the chassis of the illustrated embodiment is intended.

FIG. 1 shows that the compartment 82 has a pair of tracks or channels 86 and 88 mounted at its lower corner and running the width of the compartment. The compartment 84 on the right side of the vehicle includes a similar pair of tracks which are not shown in the drawings. These tracks or channels 86 and 88 are used to support a battery pack for mounting the batteries which energize the drive motor for the vehicle. The channels are mounted at the two sides of the compartment 82 because these sides are the strongest part of the compartment. The weight is thus supported by the lateral webs 24 and 26 which are adjacent the position where the tracks 86 and 88 are mounted. Under this arrangement, both the webs 24 and 26 and the bottom sheet 72, as seen in FIG. 3, are loaded in tension by the batteries.

As mentioned above, it is preferable to have the closed compartments beneath as large a portion of the load-carrying area of the chassis 10 as possible. Where certain of the compartments cannot be "closed" in accordance with this invention, the existing sides of these compartments can be braced by having smaller closed compartments adjacent these sides, and by including more than one compartment adjacent any one side. Thus, the compartment 78 is included adjacent the lateral web 24 of the open compartment 82. Similar compartments adjacent the webs 24 and 26 perform the same function. A compartment 90 formed by the webs 18, 20, 62, and 14 at the center of the rear of the chassis 10 provides the same function with respect to the open compartment 80 near the rear of the chassis.

The type of vehicle for which the chassis is intended determines the shape and structure of the chassis, the position of the closed compartments used for structural support in accordance with this invention, and the shape of the closed compartments themselves. For example, referring to FIG. 2, the closed compartment 76 not only provides structural rigidity for the chassis 10, but also provides a channel through which power and control lines can be laid between the position where the driver sits at the front of the chassis and the position where the electric motor is mounted in the compartment 80 at the rear of the chassis. The portions of various webs are cut out to enable equipment to be mounted within the various closed compartments of the chassis and to allow power lines and control lines to be mounted.

The front end of the chassis shown in FIGS. 1 thru 3 is not manufactured in accordance with the principles of this invention. It too is manufactured out of sheet material such as aluminum or stainless steel sheet metal, but it does not include the closed supporting compartments as shown in these figures. The front section 42 of the left front wheel well is extended to form a step 92 at the left side of the vehicle. A similar step 94 is formed at the right side of the vehicle. The web 12 is also extended toward the front of the vehicle to provide a floor 96 in the driver's portion of the vehicle.

Figure 4:
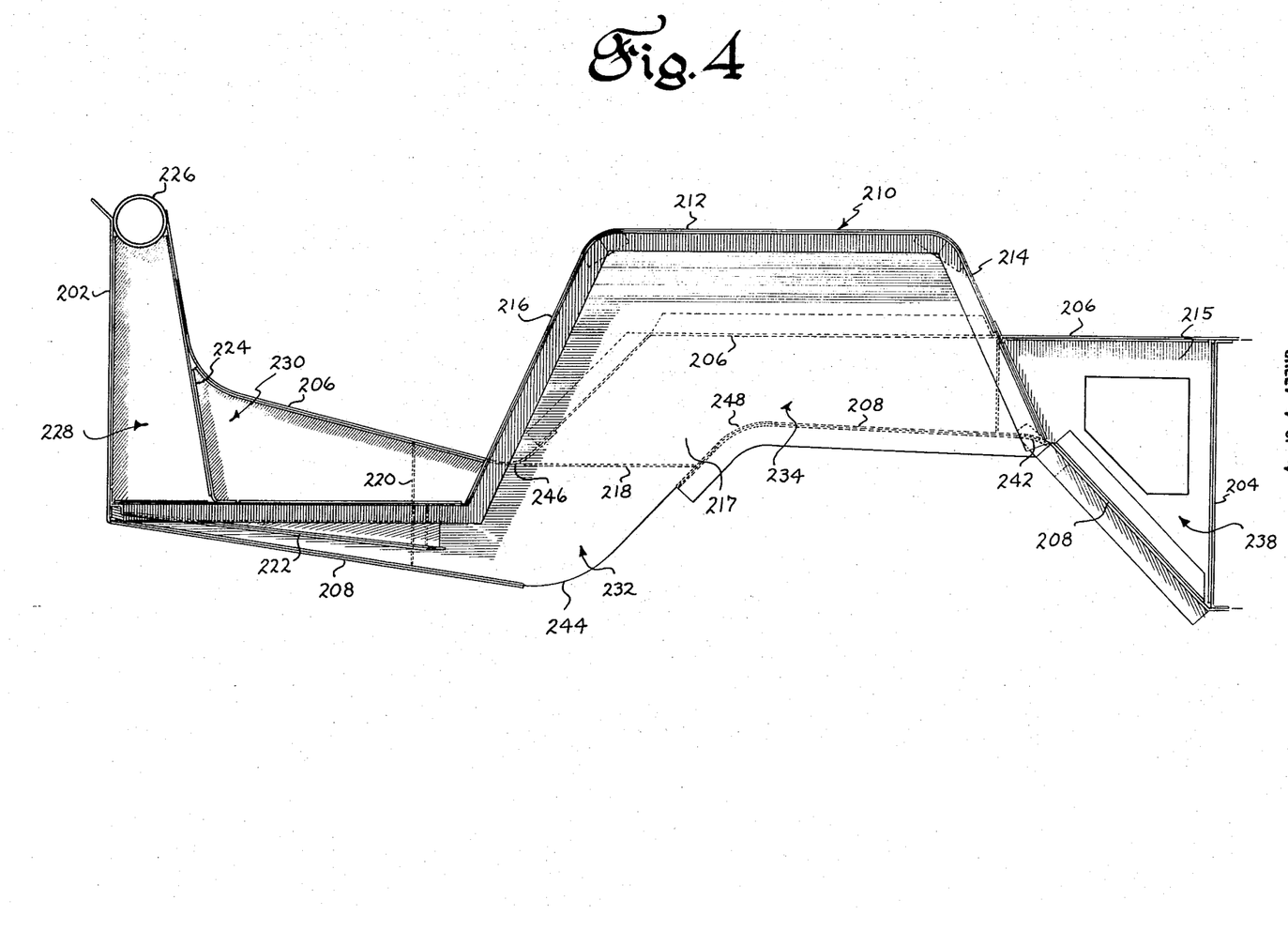
FIG. 4 is a side view of an improved front-end of a vehicle chassis which is manufactured in accordance with the principles of this invention.

FIG. 4 is a side view of an improved front end of a vehicle chassis which incorporates the principles of this invention. Closed supporting compartments are used for additional strength and support throughout the entire front end of the chassis and for the purpose of enabling the front end of the chassis to absorb energy upon impact of the vehicle with a solid object. Thus, the front end of the chassis, from a laterally extending front web 202 across the width of the chassis and to a lateral web 204 on the right of FIG. 4 includes a plurality of the closed supporting compartments described above. The lateral web 204 corresponds to the web 24 shown in the previous drawings. The front end of the chassis is further improved through the use of a plurality of plastic hinge points or areas which, with the use of the closed supporting compartments, provide predictable points of failure in the front end of the chassis should the vehicle using this chassis strike a solid object. These predictable points of failure allow the chassis to absorb some of the energy of impact of the vehicle, rather than let this energy be transmitted to the load of the vehicle.

Thus, a top sheet 206 which aids in forming the supporting compartments extends along the front end of the vehicle from the lateral web 204 in FIG. 4 into the area where the driver is located. A bottom sheet 208 also extends throughout the entire area.

FIG. 4 includes a wheel well 210 which corresponds to the left front wheel well 32 of the previous drawings. The wheel well 210 comprises a top section 212, a rear section 214, and a front section 216. The front section 216 is extended in a longitudinal direction to form a step similar to the step 92 of the previous drawings. A web 217 forms the interior surface of the wheel well 210, and provides a web for a closed supporting compartment adjacent the wheel well 210. The drawing shows that the top sheet 206 at the left side of the chassis is bent upward on the interior side of the web 217 to allow the top sheet 206 to be securely fastened to the web 217. Other pieces of sheet material are shown to be bent over in the same manner for fastening purposes in FIG. 4. These include, for example, the top section 212, the rear section 214, and the front section 216 of the wheel well 210. This is similar to the manner in which corresponding portions of the chassis shown in FIG. 1 are bent over for fastening purposes.

A web 215 covers the outside of a compartment 238 which is bordered by the lateral web 204, the rear section 214 of the wheel well 210, the top sheet 206, and the bottom sheet 208. This compartment corresponds to the compartment 78 of FIG. 2. A compartment corresponding to 238 is included at the rear of the wheel well on the right side of the front end of the chassis shown in FIG. 4. The area between these two triangular-shaped compartments is split up into five longitudinal supporting compartments by six longitudinally extending webs. These include the web 217 and a corresponding web adjacent the right front fender between the lateral web 204 and the front web 202. The two centermost webs extend the full length of the vehicle from the front web 202 to the rear of the vehicle. These two webs correspond to the webs 18 and 20 shown in FIG. 2, except that the centermost webs extend beneath the driver's area of the chassis as well. Two additional longitudinal webs are added between the two centermost webs, from the web 202 at the front of the vehicle to the dotted line which begins at the corner where the top sheet 206 is joined with the rear section 214 of the wheel well 210. This additional pair of lateral webs forms seven longitudinally extending compartments between that dotted line and the front web 202 and adds to the strength and rigidity of the front end of the chassis.

The outermost compartment on each side of the front of the vehicle includes additional braces, horizontal brace 218 and vertical brace 220, to close the compartments from road dirt and grime. As shown, the outer compartment 232 is open at its lower end to allow for mounting the suspension of the vehicle. These braces 218 and 220 also act as supporting webs which make up for the fact that the outer compartment 232 is open to allow suspension to be mounted therein. Furthermore, additional pieces of sheet metal have been added on both of the longitudinal sides of the compartment 232 to stiffen this open compartment. A vertically extending web 224 forms the front end of a step and extends across the width of the vehicle as an extension of top sheet 206. The web 224 and the front web 202 have a tube 226 mounted between them at the top of the front end of the chassis. A diagonal brace 222 is also provided at the front end of the chassis. 228 represents the foremost portion of the longitudinal compartments, that portion between the webs 202 and 224, and also bounded by the tube 226 and the bottom sheet 208. The compartment 230 adjacent the compartment 228 extends into the compartment 228 without a lateral web mounted therebetween. The various longitudinal webs, such as 217, extend through compartment 230 and into compartment 228.

The front end of the chassis comprises the plurality of compartments discussed above which are shown to be in a "dog-leg" type of formation. That is, that portion of the longitudinal web 217 which covers the compartments 230 at the front of the vehicle is at a first vertical height, while that portion of the web 217 which covers compartments generally shown as 234 is at a second vertical height. A third portion of the web 217 covering the compartment generally indicated as 232 extends between the first two sections to interconnect them. These three portions of the web 217 form the "dog-leg" and allow the front end of the chassis shown in FIG. 4 to absorb energy upon impact of the front of the motor vehicle with a solid object.

In this regard, plastic hinge points or areas exist between the bends 244 and 246 on the longitudinal webs forming compartment 232 and the adjacent compartments. Plastic hinge points or areas also exist between bend 248 and the point where the top sheet 206 bends downwardly to the upper left of the bend 248. Because of the bends in the chassis at these hinge areas and because the closed supporting compartments before and after the hinge areas provide a rigid structure, the chassis can be made to predictably fail upon impact with a solid object to absorb some of the impact energy.

The mass of the vehicle and the theoretical velocity at impact can be determined to calculate the energy level to which the vehicle is subjected upon impact with a solid object. With the impact energy known, the type and thickness of material used for the top and bottom sheets and the longitudinal webs such as 217 and the height of these webs can be analyzed to determine the energy which is absorbed when deformation occurs in the hinge areas. Determinations such as the maximum distance which the front compartment 228 is to move as a result of the impact, and the amount of energy which the crushing of the compartment 228 consumes also play a part in analyzing the type of predictable failure in the hinge areas. Thereafter, by trial and error and by repeated structural analysis, the chassis of this invention can be designed to fail in the areas of the plastic hinge at or near points 244 and 248 for a preselected distance. The crushing caused by the failure at these plastic hinge areas allows the chassis to absorb a quantity of the energy of impact of a vehicle, so that this energy is not totally transmitted to the load of the vehicle.

The chassis of the illustrated embodiment of this invention is intended for use with an electric vehicle. The electric storage batteries are contained in compartments which are located behind the web 204 of FIG. 4, in compartments such as 82 and 84 of the previous drawings. The improved front end of the chassis shown in FIG. 4 includes an additional plastic hinge point or area between the bend 242 at the rear of the fender and the bend where the top sheet 206 is marked at the rear of the front end shown in FIG. 4. This plastic hinge area allows these batteries to move forward beneath the load-carrying area of the chassis. In this manner, damage which may be done by the batteries upon impact with a solid object is minimized. As indicated above, the mass of the batteries, the velocity at impact, and the structure of the chassis in the area of the plastic hinge 242 should be analyzed to determine how the failure should predictably occur.

It is to be understood, of course, that the embodiments of this invention set forth herein are described in detail to present a full and clear description of the invention, and the invention itself is not limited to the details of the particular embodiments presented. For example, referring to FIG. 2, it is possible to produce a vehicle chassis in accordance with this invention wherein a singular longitudinally extending web, such as the web 18, is used, either for a portion of the length of the chassis or for the full length of the chassis. While the chassis such as that shown in FIGS. 1-3 has been made out of type 304 stainless steel which is thirty thousandths of an inch thick, and a chassis having a front end such as that shown in FIG. 4 has used the same material which is fifty thousandths of an inch thick, it is contemplated that many types of metallic or plastic sheet material can be used. Thus, various changes and modifications and substitutions can be made in the embodiments described without departing from the true scope and spirit of this invention which is defined in the appended claims.

I claim:

1. A lightweight chassis to provide support for a motor vehicle and to withstand torsional loads which occur during the operation of the vehicle with a minimal distortion, said chassis comprising, in combination:
   a. A plurality of vertical webs of thin gauged sheet material including at least a first web extending the length of the load-carrying area of said chassis and at least a second pair of said webs extending across the width of said chassis, between the area where the front wheels are to be mounted and the area where the rear wheels are to be mounted;
   b. a top layer of thin gauged sheet material extending substantially the length and width of said chassis;
   c. a bottom layer of thin gauged sheet material, substantially integral throughout the load-carrying area of the chassis to withstand stress in tension, said bottom layer extending substantially the length and width of said chassis; and
   d. Means for fastening said top layer and said bottom layer of thin gauged sheet material to said webs to form a plurality of closed supporting compartments which extend under a substantial portion of the load-carrying area of said chassis so as to provide structural rigidity for said chassis.

2. A lightweight chassis for motor vehicles according to claim 1 wherein said first web is tapered in decreasing height as said web extends away from the center thereof in both directions.

3. A lightweight vehicle chassis according to claim 2 wherein said tapered web forms a chassis having an approximately constant beam strength along the length of the said chassis.

4. A lightweight chassis for motor vehicles according to claim 1 wherein said first web is continuous in height along a center portion of said chassis and is tapered in decreasing height as said web extends away from said center section in both directions to form closed compartments having an approximately constant beam strength along the length of said chassis.

5. A lightweight chassis according to claim 1 which includes at least one compartment which is not closed, said non-closed compartment requiring one side to become closed.

6. A lightweight chassis according to claim 1 which includes a pair of webs extending the length of the load carrying area of said chassis and wherein said second pair of said webs is mounted at the opposite ends of said lightweight chassis, with at least one additional web mounted across the width of said chassis between said ends.

7. A lightweight vehicle chassis according to claim 1 wherein said closed supporting compartments provide structural rigidity over the full length of the chassis; said chassis further including a first portion of said first web extending from the front of said chassis at a first height, a second portion of said first web extending along a portion of the length of said chassis near the front thereof at a second height, and a third portion of said first web interconnecting said first and second portion to form plastic hinge areas of predictable failure at the intersection with the first and second portions to absorb energy upon impact of the front of the motor vehicle with a solid object.

8. A lightweight front end of a motor vehicle chassis comprising, in combination:
  a. A plurality of vertical webs of thin gauged sheet material including at least a first pair of webs extending the length of said front end and at least a second pair of said webs extending across the width of said front end;
  b. said first pair of webs including a first portion extending from the front of said front end at a first height, a second portion extending along the length of said front end at the second height, and a third portion interconnecting said first and second portion to form plastic hinge areas of predictable failure at the intersection with the first and second portions to absorb energy upon impact of the front of the motor vehicle with a solid object;
  c. a top layer of thin gauged sheet material extending substantially the length and width of said front end;
  d. a bottom layer of thin gauged sheet material, substantially integral throughout the front end to withstand stress in tension said bottom layer extending substantially the length and width of said front end; and
  e. means for fastening said top layer and said bottom layer of thin gauged sheet material to said webs to form a plurality of closed supporting compartments which extend under a substantial portion of said front end so as to provide structural rigidity for said front end.

* * * * *